United States Patent
Manzoor et al.

(10) Patent No.: US 11,043,834 B2
(45) Date of Patent: Jun. 22, 2021

(54) METHOD AND SYSTEM OF PREDICTING RECHARGING OF BATTERY OF VEHICLE AT CHARGING STATION AND CORRESPONDENT PRE-COOLING OF THE BATTERY USING COLD STORAGE AS THE VEHICLE IS BEING DRIVEN TO THE CHARGING STATION

(71) Applicant: Ford Global Technologies, LLC, Dearborn, MI (US)

(72) Inventors: Waqas Ahmed Manzoor, Windsor (CA); Daniel C. Huang, Rochester Hills, MI (US); Yinhua Zheng, Canton, MI (US); Brian Joseph Robert, St. Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 16/456,826

(22) Filed: Jun. 28, 2019

(65) Prior Publication Data
US 2020/0412160 A1 Dec. 31, 2020

(51) Int. Cl.
| | |
|---|---|
| *H02J 7/04* | (2006.01) |
| *H02J 7/14* | (2006.01) |
| *B60L 53/14* | (2019.01) |
| *B60L 50/60* | (2019.01) |
| *B60L 58/26* | (2019.01) |
| *B60L 50/10* | (2019.01) |
| *B60L 58/14* | (2019.01) |

(52) U.S. Cl.
CPC ............ *H02J 7/1446* (2013.01); *B60L 50/10* (2019.02); *B60L 50/60* (2019.02); *B60L 53/14* (2019.02); *B60L 58/14* (2019.02); *B60L 58/26* (2019.02)

(58) Field of Classification Search
None
See application file for complete search history.

(56) References Cited

U.S. PATENT DOCUMENTS

| | | | |
|---|---|---|---|
| 6,215,281 | B1 | 4/2001 | Koch |
| 7,755,329 | B2 | 7/2010 | Kohn et al. |
| 9,496,588 | B2 | 11/2016 | Nguyen et al. |
| 9,676,283 | B2 | 6/2017 | Jackson et al. |
| 10,099,562 | B2 | 10/2018 | Jin et al. |

(Continued)

FOREIGN PATENT DOCUMENTS

| | | |
|---|---|---|
| DE | 102015118466 A1 | 5/2016 |
| WO | 2016083529 A1 | 6/2016 |

*Primary Examiner* — Arun C Williams
(74) *Attorney, Agent, or Firm* — David B. Kelley; Brooks Kushman P.C.

(57) ABSTRACT

A method and system for an electric vehicle include a controller and a battery cooling system. The controller automatically detects when the vehicle is being driven to a charging station. The controller controls the battery cooling system to pre-cool a traction battery of the vehicle as the vehicle is being driven to the charging station so that the traction battery is cooled to a target temperature upon the vehicle reaching the charging station. The battery cooling system includes a phase change material (PCM) surrounding at least a portion of the traction battery. The traction battery is pre-cooled by circulating refrigerant coolant to the PCM to cool the PCM and thereby pre-cool the traction battery.

17 Claims, 4 Drawing Sheets

(56) References Cited

U.S. PATENT DOCUMENTS

| | | | |
|---|---|---|---|
| 10,695,530 B1 * | 6/2020 | Surace | A61M 21/02 |
| 2008/0179040 A1 | 7/2008 | Rosenbaum | |
| 2009/0023056 A1 | 1/2009 | Adams et al. | |
| 2013/0127417 A1 * | 5/2013 | Karner | B60L 53/63 |
| | | | 320/109 |
| 2014/0012447 A1 * | 1/2014 | Gao | B60L 53/11 |
| | | | 701/22 |
| 2016/0129797 A1 * | 5/2016 | Jackson | B60L 53/14 |
| | | | 320/109 |

* cited by examiner

METHOD AND SYSTEM OF PREDICTING RECHARGING OF BATTERY OF VEHICLE AT CHARGING STATION AND CORRESPONDENT PRE-COOLING OF THE BATTERY USING COLD STORAGE AS THE VEHICLE IS BEING DRIVEN TO THE CHARGING STATION

TECHNICAL FIELD

The present invention relates to pre-cooling a traction battery of an electric vehicle.

BACKGROUND

An electric vehicle includes a traction battery for supplying energy for vehicle propulsion. The traction battery is rechargeable with energy from the electric grid. Recharging generates heat that may raise the traction battery temperature to an allowable maximum temperature and thus cause the recharging to be terminated prematurely.

SUMMARY

In an embodiment, a method for an electric vehicle ("EV") is provided. The method includes automatically detecting by a controller of the EV that the EV is being driven to a charging station. The method further includes pre-cooling a traction battery of the EV as the EV is being driven to the charging station so that the traction battery is cooled to a target temperature upon the EV reaching the charging station.

The method may further include comparing, by the controller, a state of charge ("SOC") of the traction battery to a SOC threshold. Automatically detecting that the EV is being driven to the charging station requires that the SOC of the traction battery be less than the SOC threshold.

The method may further include estimating, by the controller, a discharge rate of the traction battery. Automatically detecting that the EV is being driven to the charging station depends on the discharge rate of the traction battery.

The method may further include detecting, by the controller, a proximity of the EV to the charging station. Automatically detecting that the EV is being driven to the charging station depends on the proximity of the EV to the charging station.

Pre-cooling the traction battery may include pre-cooling the traction battery at a cooling rate dependent on the discharge rate, the proximity of the EV to the charging station, and a charging rate of the charging station.

Pre-cooling the traction battery may include cooling a phase change material ("PCM") surrounding at least a portion of the traction battery by circulating refrigerant coolant to the PCM to cool the PCM.

Another method for an EV is provided. This method includes pre-cooling a traction battery of the EV upon detecting that the EV is being driven to a charging station. Pre-cooling the traction battery includes cooling a PCM surrounding at least a portion of the traction battery as the EV is being driven to the charging station such that the traction battery is cooled to a target temperature upon the EV reaching the charging station.

Pre-cooling the traction battery may include cooling the PCM as the EV is being driven to the charging station at a cooling rate dependent on a discharge rate of the traction battery and a distance between the EV and the charging station.

The PCM may be configured to convert from a liquid state to a solid state as the PCM is being cooled to thereby pre-cool the traction battery. In this case, the PCM is cooled to the solid state when the traction battery is cooled to the target temperature.

A system for an EV includes a battery cooling system and a controller. The controller is configured to automatically detect that the EV is being driven to a charging station and to control the battery cooling system to pre-cool a traction battery of the EV as the EV is being driven to the charging station so that the traction battery is cooled to a target temperature upon the EV reaching the charging station.

The controller may be further configured to compare a SOC of the traction battery to a SOC threshold and to require that the SOC of the traction battery be less than the SOC threshold for the controller to automatically detect that the EV is being driven to the charging station.

The controller may be further configured to estimate a discharge rate of the traction battery. While the SOC of the traction battery is less than the SOC threshold, the controller is further configured to automatically detect that the EV is being driven to the charging station depending on the discharge rate of the traction battery. The controller may be further configured to estimate the discharge rate of the traction battery depending on at least one of driving conditions of the EV and driving behavior by an operator of the EV.

The controller may be further configured to detect a proximity of the EV to the charging station. While the SOC of the traction battery is less than the SOC threshold, the controller is further configured to automatically detect that the EV is being driven to the charging station depending on the proximity of the EV to the charging station. The controller may be further configured to detect the proximity of the EV to the charging station depending on at least one of a time of day and a location of the EV.

The controller may be further configured to control the battery cooling system to pre-cool the traction battery while the EV is being driven to the charging station based on a discharge rate of the traction battery and a distance between the EV and the charging station while the traction battery is discharging as the EV is being driven to the charging station. The controller may be further configured to control the battery cooling system to pre-cool the traction battery while the EV is being driven to the charging station based on a charge rate of the traction battery and a distance between the EV and the charging station while the traction battery is being charged as the EV is being driven to the charging station.

The battery cooling system may include (i) a PCM surrounding at least a portion of the traction battery and (ii) a source of refrigerant coolant. In this case, the controller controlling the battery cooling system to pre-cool the traction battery as the EV is being driven to the charging station includes circulating the refrigerant coolant to the PCM to cool the PCM and thereby pre-cool the traction battery.

The PCM may be configured to convert from a liquid state to a solid state as the PCM is being cooled to thereby pre-cool the traction battery. In this case, the PCM is in the solid state when the traction battery is cooled to the target temperature. The PCM converts from the solid state to the liquid state to absorb heat generated from recharging the traction battery at the charging station. The PCM may include paraffin wax.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
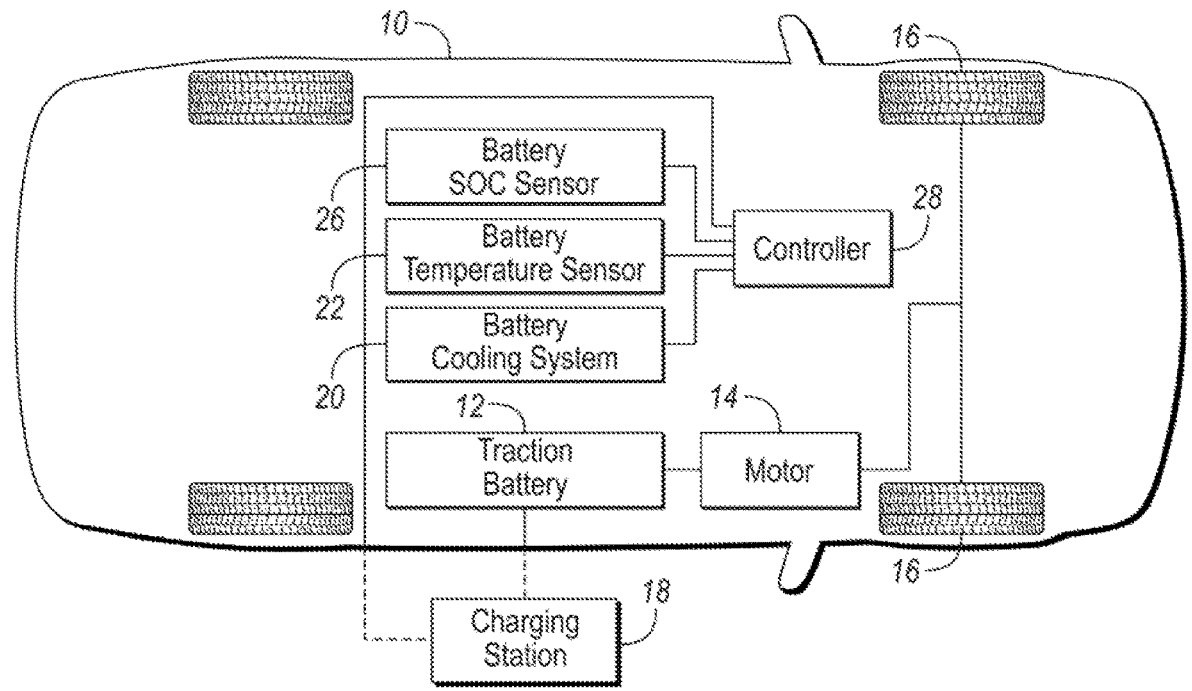
FIG. 1 illustrates a block diagram of an electric vehicle ("EV") in accordance with an embodiment.

Referring now to FIG. 1, a block diagram of an electric vehicle ("EV") 10 in accordance with an embodiment is shown. EV 10 includes a traction battery 12 for supplying energy for vehicle propulsion. For instance, traction battery 12 is a lithium-ion battery pack.

Types of EVs include a battery electric vehicle (BEV) and a plug-in hybrid electric vehicle (PHEV). A BEV lacks an internal combustion engine and the energy for vehicle propulsion is provided entirely by the traction battery. A PHEV includes an internal combustion engine and the energy for vehicle propulsion is provided by the engine and the traction battery. In this embodiment, EV 10 is a BEV. In other embodiments, EV 10 may be a PHEV or some other type of EV.

EV 10 further includes an electric motor 14. Motor 14 converts electrical energy from traction battery 12 into a motor torque for vehicle propulsion. Traction battery 12 supplies electrical energy to motor 14 through an inverter (not shown) connected between the traction battery and the motor. Traction battery 12 discharges to supply the electrical energy to motor 14. Motor 14 provides the motor torque to a vehicle drivetrain to drive wheels 16 of EV 10 to propel the EV.

Alternatively, motor 14 may function as a generator and convert kinetic energy from the powertrain of EV 10 into electric energy to be stored in traction battery 12. For instance, motor 14 may function as a generator during times of regenerative braking in which rotational energy from wheels 16 is converted into electrical energy for storage in traction battery 12. In the case of EV 10 having an engine, motor 14 may act as a generator while the engine is providing propulsion power for the EV. In these ways, traction battery 12 is charged with electrical energy while EV 10 is being driven.

Traction battery 12 is rechargeable with electrical energy from the electric grid at a charging station 18. Charging stations 18 are located at places where the operator of EV 10 ordinarily drives the EV. Such places may include the home, school, place of work, etc., of the operator of EV 10. Of course, publicly accessible charging stations 18 may be located at other places within the driving range of EV 10 when the EV is at a given location.

Traction battery 12 has a state of charge ("SOC") that is indicative of an amount of electrical energy stored by the traction battery. The SOC is equivalent to a fuel gauge. The SOC of traction battery 12 is 100% when the traction battery is fully charged and is 0% when the traction battery is fully discharged.

Charging station 18 provides electrical energy from the electric grid to traction battery 12 to recharge the traction battery. Traction battery 12 is to be recharged after EV 10 has been driven such that the traction battery has discharged to have a minimal SOC. A recharging event includes the operator driving EV 10 to and parking the EV at charging station 18. Traction battery 12 is then plugged into (i.e., coupled to) charging station 18 to be recharged.

EV 10 further includes an on-board, battery cooling system 20 configured to cool traction battery 12. Battery cooling system 20 operates to cool or remove heat from traction battery 12 to lower the temperature of the traction battery.

Figure 2:
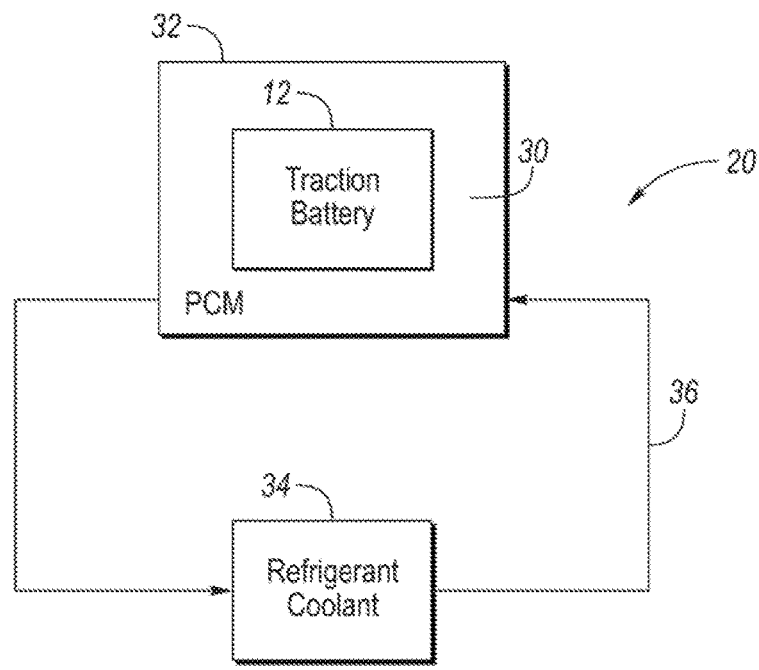
FIG. 2 illustrates a block diagram of a battery cooling system of the EV in cooperative arrangement with a traction battery of the EV in accordance with an embodiment.

Referring now to FIG. 2, with continual reference to FIG. 1, a block diagram of battery cooling system 20 in cooperative arrangement with traction battery 12 in accordance with an embodiment is shown. Battery cooling system 20 includes a Phase Change Material (PCM) 30. In this embodiment, PCM 30, such as paraffin wax, is packaged or disposed within a battery case 32 of traction battery 12 to surround at least a portion of the traction battery.

PCM 30 is solid when its temperature is relatively low (e.g., when the temperature of the PCM is near or less than the air temperature of the environment in which EV 10 is located, referred to as the "ambient temperature"). Conversely, PCM 30 is liquid when its temperature is relatively high (e.g., when the temperature of the PCM is near or greater than the temperature of traction battery 12 during vehicle propulsion).

Traction battery 12 heats up while discharging and charging during vehicle propulsion. The temperature of traction battery 12 is higher when the traction battery is discharged faster during heavy driving conditions and thereby generates more heat than compared to light driving conditions. Similarly, the temperature of traction battery 12 is higher when the traction battery is charged by high current, which heats the traction battery quickly, than when the traction battery is charged with low current, which heats the traction battery slowly.

PCM 30 absorbs heat from traction battery 12 as the PCM surrounds at least a portion of the traction battery. PCM 30 thus heats up in correspondence with traction battery 12. Typically, the heat absorbed by PCM 30 from traction battery 12 during vehicle propulsion is enough to cause the PCM to change from solid to liquid. Thus, during vehicle propulsion, traction battery 12 and PCM 30 both have a temperature much greater than the ambient temperature and the PCM is in liquid state.

PCM 30 may be cooled to cool traction battery 12. The cooling of PCM 30 to cool traction battery 12 may take place during vehicle propulsion. Cooling PCM 30 causes traction battery 12 to cool as the PCM surrounds at least a portion of the traction battery. Thus, by cooling PCM 30, traction battery 12 is cooled to have a lower temperature than what the temperature of the traction battery would otherwise be if PCM 30 were not cooled. PCM 30 may be cooled to a low enough temperature such that the PCM changes state from liquid to solid. Thus, in this cooling state of PCM 30, traction battery 12 and the PCM both have a relatively low temperature and the PCM is in solid form. In this way, battery cooling system 20 provides "cold storage".

To cool PCM 30, and thereby cool traction battery 12, battery cooling system 20 further includes a source 34 of refrigerant coolant and a conduit 36. Conduit 36, such as tubing, hoses, piping, is connected in a closed flow circuit between battery case 32 and coolant source 34. Conduit 36 is connected to an inlet and an outlet of battery case 32 and is connected to an inlet and an outlet of coolant source 34. Conduit 36 transports refrigerant coolant from coolant source 34 into and through fluid channels (not shown) in battery case 32 to cool PCM 30 and thereby cool traction battery 12. The refrigerant coolant cools PCM 30 by absorbing heat from the PCM and carrying the absorbed heat out of battery case 32. Conduit 36 transports the heated refrigerant coolant out of battery case 32 to coolant source 34. Coolant source 34 is configured to cool the heated refrigerant coolant so that the refrigerant coolant can be delivered again through conduit 36 to battery case 32 to cool PCM 30 and traction battery 12.

Instead of the solid-liquid conversion characteristic, in other embodiments PCM 30 may have a liquid-vapor conversion characteristic. In this case, PCM 30 is liquid when its temperature is relatively low and is vapor when its temperature is relatively high.

When battery cooling system 20 is operated while EV 10 is being driven, traction battery 12 supplies electrical energy to the battery cooling system to power its operation. As such, in addition to discharging for vehicle propulsion, traction battery 12 discharges to power battery cooling system 20 while EV 10 is being driven. This electrical energy discharged from traction battery 12 for cooling system 20 will therefore be unavailable for vehicle propulsion.

Referring now back to FIG. 1, EV 10 further includes a battery temperature sensor 22 and a battery SOC sensor 26. Battery temperature sensor 22 is physically connected to traction battery 12 to detect the temperature of the traction battery. Battery SOC sensor 26 is a computer processor or the like configured to detect the SOC of traction battery 12. Battery SOC sensor 26 has access to appropriate input information of traction battery 12 for detecting the traction battery SOC.

EV 10 further includes a controller 28 in communication with battery cooling system 20 and sensors 22 and 26. Controller 28 is in communication with charging station 18 when EV 10 is plugged into the charging station. Controller 28 is an electronic vehicle controller(s) such as a computer, a processor, or the like.

As noted, EV 10 is driven to charging station 18 for traction battery 12 to be plugged into the charging station to be recharged. Charging station 18 provides electrical energy from the electric grid to traction battery 12 to recharge the traction battery. Charging station 18 may recharge traction battery 12 at various charging rates.

In an embodiment, charging station 18 provides relatively high amperage electrical current to traction battery 12. For instance, charging station 18 is a "DC fast charge" charging station which uses high voltage (e.g., 400-500V) and high current (e.g., 100-300 A) to recharge traction battery 12. DC fast charging reduces charging time by using the high voltage and high current. DC fast charge is a Level 3 charging process as defined by SAE J1772. In other embodiments, charging station 18 may provide even higher amperage electrical current to recharge traction battery 12. In other embodiments, charging station 18 provides relatively low amperage electrical current to traction battery 12. For instance, in these other embodiments, charging station 18 is configured to provide a Level 1 or Level 2 charging process, as defined by SAE J1772. In other embodiments, charging station 18 recharges traction battery 12 with normal line current, through inductive charging, or by other methods.

Recharging traction battery 12 by charging station 18 generates heat that raises the traction battery temperature. With enough heat generated, the traction battery temperature will rise to an allowable maximum temperature at which charging station 18 is to terminate the recharging (i.e., pause or stop the recharging). Terminating the recharging ceases heat generation and thereby enables traction battery 12 to cool. However, terminating the recharging due to the traction battery temperature reaching the allowable maximum temperature means that the recharging is terminated prematurely as traction battery 12 will not be not fully recharged (i.e., SOC<100%). Alternatively, when the traction battery temperature is rising quickly towards the allowable maximum temperature, the recharging may be slowed down (e.g., decrease the amperage of the current from charging station 18) to slow the heat generation so that the allowable maximum temperature is not reached.

Accordingly, in accordance with embodiments, traction battery 12 is cooled prior to the recharging at charging station 18 (i.e., "pre-cool") to thereby lower the traction battery temperature at the start of the recharging. Traction battery 12 is pre-cooled as EV 10 is being driven to charging station 18 such that the traction battery temperature is lowered to a set temperature upon the EV arriving at the charging station. The lowered set temperature is lower than what the traction battery temperature would be if traction battery 12 were not pre-cooled.

Pre-cooling traction battery 12 to the lowered set temperature enlarges the temperature difference between the traction battery temperature and the allowable maximum temperature. Hence, when the traction battery temperature is at the lowered set temperature upon initiation of the recharging, the recharging can be completed prior to the traction battery temperature reaching the allowable maximum temperature. That is, when the traction battery temperature is at the lowered set temperature at the beginning of the recharging the duration of the recharging may be extended long enough to allow traction battery 12 to be fully recharged (i.e., SOC=100%) without the traction battery temperature reaching the allowable maximum temperature.

Controller 28 is configured to control battery cooling system 20 to cool PCM 30 and thereby cool traction battery 12. More particularly, controller 28 is configured to control battery cooling system 20 to cool PCM 30 while EV 10 is being driven and thereby pre-cool traction battery 12 while the EV is being driven to charging station 18. Thus, when controller 20 is made aware that EV 10 is being driven to charging station 18, PCM 30 and thereby traction battery 12 can be cooled at a cooling rate dependent on the distance from the EV to the charging station (i.e., the distance until charge ("DUC")) such that the traction battery is cooled to the lowered set temperature at the start of recharging at the charging station.

Furthermore, as controller 28 identifies and evaluates the SOC of traction battery 12, and with the assumption that the controller has recorded any changes in capacity over life from a plurality of fast charge cycles, that the level of pre-cooling may also be tuned toward the charge profile/rate (C-rate, CV vs. CC) that the traction battery is likely to experience. Factors that contribute to this include previous capacity degradation over life (commonly from higher temperature exposure and multiple fast charge cycles), anticipated time available to charge traction battery 12 (operator determined), and known battery resistance from starting SOC to anticipate generated heat. This may also input PCM target temperature for anticipated dT/dt heat adsorption with solid state or semi-solid state pre-conditioning as anticipated by charging thermal load.

In accordance with embodiments, EV 10 achieves higher range and fast-charge capabilities through a smart and advanced thermal management system. In this regard, controller 28 employs a predictive control strategy that assesses the need and probable intention of the operator of EV 10 to seek a charging station 18. The charging station sought may be a fast-charge charging station. Controller 28 correspondingly controls the temperature setpoint profile of traction battery 12 optimally such that the traction battery is sufficiently cold by the time recharging begins at the charging station 18.

As described herein, battery cooling system 20 provides "cold storage" by using PCM 30 to cool traction battery 12 as EV 10 is being driven to charging station 18. By pre-cooling traction battery 12, the duration wherein heat due to recharging reaches the allowable maximum temperature is extended. Consequently, a greater amount of charge is ultimately achieved as compared to the case where precooling is not done.

An optimal cooling strategy employed by controller 28 may use a Model Predictive Control or other algorithm (e.g., adaptive control, proportional-integral-derivative, etc.) applied to a thermal model of traction battery 12. The traction battery thermal model has a known (i.e., measured) SOC of traction battery 12 and an estimated discharge rate of the traction battery. The estimated discharge rate is derived from any available information including available information pertaining to usage of EV 10, location of the EV, and drive behavior of the EV.

The cooling strategy initially involves measurement of the SOC of traction battery 12 and evaluating the SOC to detect whether the SOC is lower than a given threshold. If the SOC is lower than the threshold, then a likelihood calculation is performed to determine whether (fast-charge) recharging is an intended or required option. The likelihood calculation is determined based on given available data (e.g., usage of EV 10, location of the EV, and drive behavior of the EV).

At this point, a notification may be presented to the operator of EV 10 to confirm such action (i.e., to confirm that the EV is being driven to charging station 18). Within a window of uncertainty, partial pre-cooling of traction battery 12 may begin as a precautionary measure.

As described herein, pre-cooling of traction battery 12 is done by refrigerating coolant such as by using a compact vehicle thermal management system and the "cold storage" is established by way of a solidified PCM 30. During recharging at charging station 18, solidified PCM 30 absorbs latent heat required to change the phase of the PCM back to liquid.

The control strategy employed by controller 28 is to optimize the temperature profile over time such that PCM 30 is fully solid (i.e., "frozen") as close to the (fast-charge) recharging event as possible. This way, heat from the recharging will first be absorbed by PCM 30 and melt the PCM (e.g., melt the paraffin wax which comprises the PCM in an embodiment) before being exposed to traction battery 12. As noted, heat accumulation of traction battery 12 to the allowable maximum temperature causes recharging to cease due to typical battery protection/safety features. The heat accumulation of traction battery 12 is delayed as PCM 30 absorbs the initial brunt of the heat accumulation. The overall outcome therefore is a greater recharging time and resultant increase in SOC.

Figure 3A:
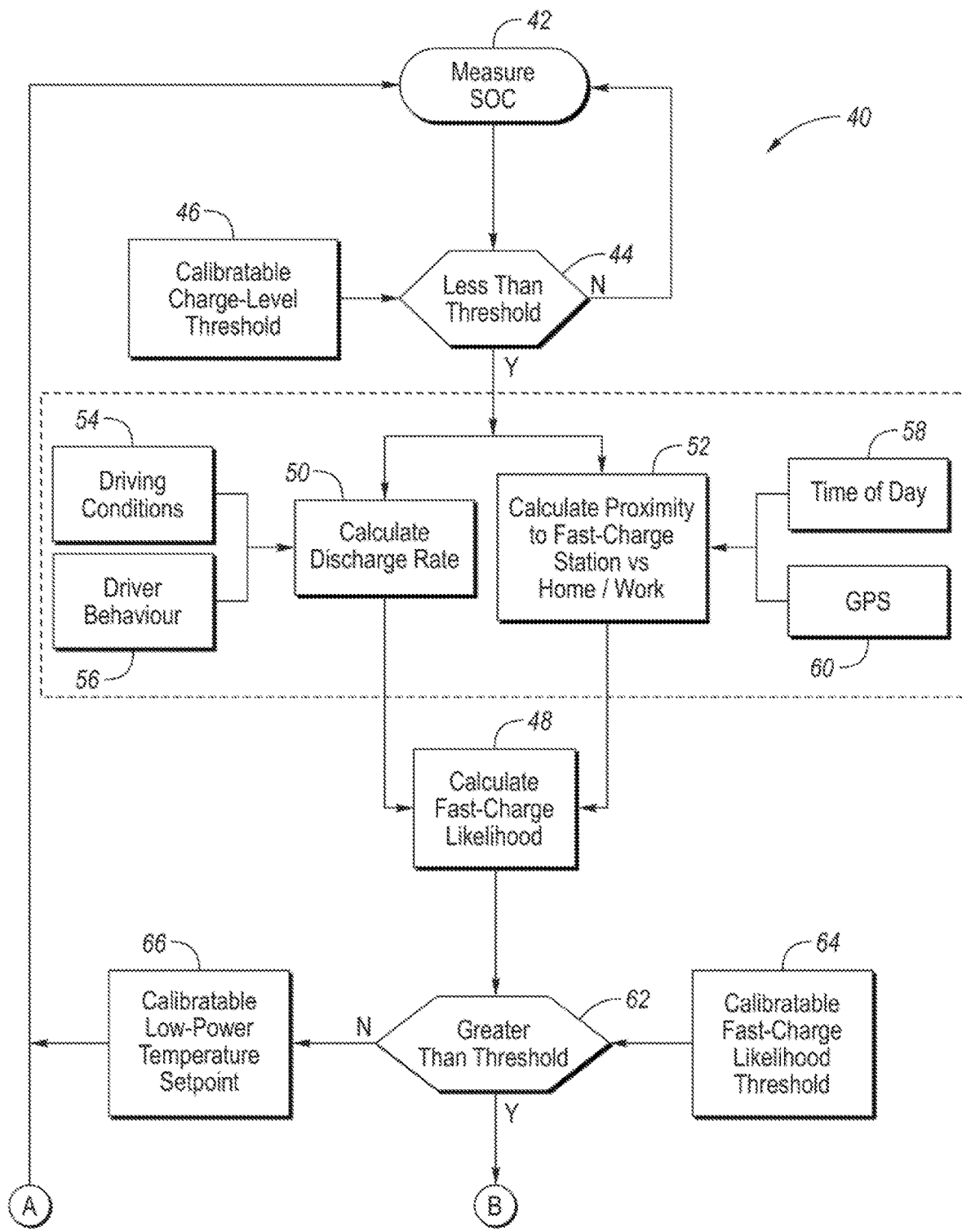
FIGS. 3A and 3B illustrate a flowchart depicting representative operations of a method and system of predicting recharging of the traction battery at a charging station and correspondent cold storage, pre-cooling of the traction battery by the battery cooling system as the EV is being driven to the charging station in accordance with an embodiment.
Figure 3B:
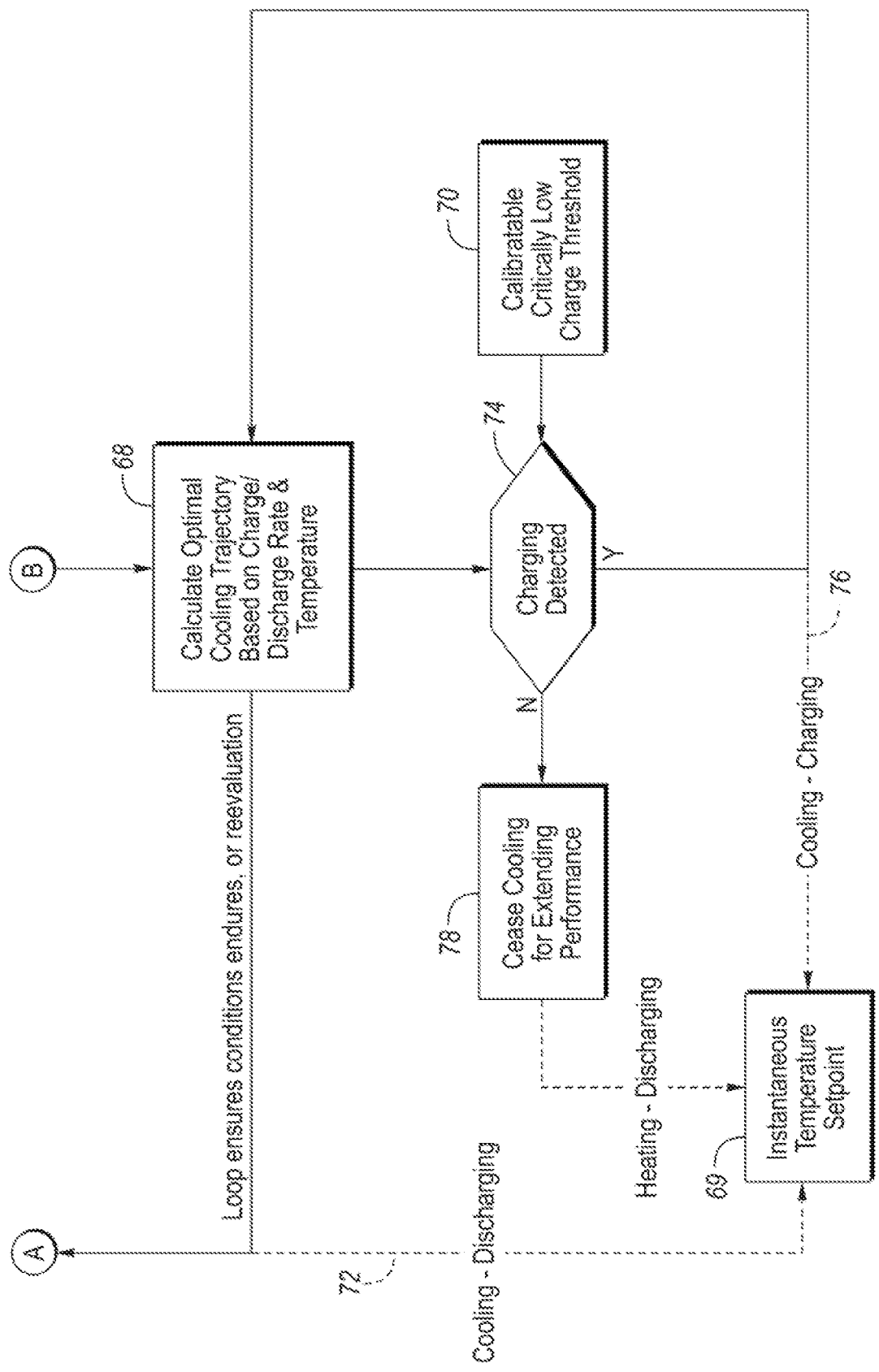

Referring now to FIGS. 3A and 3B, with continual reference to FIGS. 1 and 2, a flowchart 40 depicting representative operations of predicting recharging of traction battery 12 at a charging station 18 and correspondent pre-cooling of the traction battery using cold storage provided by battery cooling system 20 as EV 10 is being driven to the charging station in accordance with an embodiment is shown. The operation includes controller 28 using battery SOC sensor 26 to detect the SOC of traction battery 12, as indicated by block 42. Controller 28 then compares the SOC with a SOC threshold, as indicated by decision block 44. The SOC threshold is calibratable as indicated by block 46. The SOC measurement and threshold comparison process repeats while the SOC is greater than the SOC threshold.

When the SOC of traction battery 12 is less than the SOC threshold, controller 28 proceeds to perform a calculation of the likelihood that the operator is driving EV 10 to a charging station 18 to recharge the traction battery, as indicated in block 48. In this regard, controller 28 may initially perform a calculation of the discharge rate of traction battery 12, as indicated by block 50, and a calculation of the proximity of EV 10 to the charging station 18, as indicated by block 52. The calculation of the discharge rate is based on available information such as the driving conditions of EV 10, as indicated by block 54, and the driving behavior of the EV, as indicated by block 56. The calculation of the proximity of EV 10 to the charging station 18 is based on available information such as the time of day, as indicated in block 58, and the location (i.e., GPS) of EV 10 and charging station 18, as indicated by block 60.

Controller 28 calculates the likelihood that the operator is driving EV 10 to the charging station 18 to recharge traction battery 12, according to block 48, based on the discharge rate calculated in block 50 and/or the proximity of EV 10 to the charging station 18 calculated in block 52. Controller 28 then compares the calculated likelihood with a likelihood threshold, as indicated by decision block 62. The likelihood threshold is calibratable as indicated by block 64.

When controller 28 determines that it is not likely that the operator is driving EV 10 to any charging station 18 to recharge traction battery 12 (i.e., when the calculated likelihood is less than the likelihood threshold), the operations described thus far are repeated for another round starting at block 42. However, in this case, controller 28 may still control battery cooling system 20 to perform some cooling of PCM 30 to do some pre-cooling of traction battery 12. For instance, controller 28 may control battery cooling system 20 to pre-cool traction battery 12 to a low-power temperature setpoint (i.e., a temperature setpoint where PCM 30 is partially solid), as indicated in block 66. The amount of partial pre-cooling may depend on, for instance, how close the calculated likelihood is to the likelihood threshold.

When controller 28 determines that it is likely that the operator is driving EV 10 to a charging station 18 to recharge traction battery 12 (i.e., when the calculated likelihood is greater than the likelihood threshold), the controller calculates an optimal cooling trajectory for pre-cooling the traction battery, as indicated in block 68. Controller 28 calculates the optimal cooling trajectory for pre-cooling traction battery 12 based on the charge/discharge rate of the traction battery and the temperature of the traction battery. Controller 28 may further consider the distance of EV 10 to the charging station 18 (i.e., the DUC). Controller 28 may further consider the additional electric energy of traction battery 12 consumed by battery cooling system 20 while pre-cooling the traction battery. The optimal cooling trajectory may include any special strategies for thermal distribution and profile and may be model-based.

Controller 28 controls battery control system 20 to pre-cool traction battery 12 according to the optimal cooling trajectory as EV 10 is being driven to the charging station 18. The optimal cooling trajectory is intended for traction battery 12 to be pre-cooled to a lowered set temperature upon EV 10 arriving at the charging station, as indicated in block 69. The lowered set temperature is selectable and may be set to be a temperature at which PCM 30 is "frozen" solid. For example, the lowered set temperature may be 0° C.

Controller 28 further considers the SOC of traction battery 12 when controlling battery control system 20 according to the optimal cooling trajectory. As noted, battery control system 20 requires electrical energy from traction battery 12 for the battery control system to operate. Traction battery 12 thus discharges to provide this electric energy to battery control system 20. Unless traction battery 12 is recharged while EV 10 is being driven to the charging station 18, this electric energy provided to battery control system 20 will not be available for vehicle propulsion. Accordingly, while the SOC of traction battery 12 is less than a critically low charge threshold, controller 28 ceases battery control system 20 from operating to pre-cool traction battery 12. The critically low charge threshold is calibratable as indicated in block 70.

Thus, while the SOC of traction battery 12 is greater than the critically low charge threshold, controller 20 controls battery control system 20 according to the optimal cooling trajectory. In this regard, as traction battery 12 discharges to propel EV 10 to the charging station 18, controller 28 controls battery control system 20 according to the optimal cooling trajectory as a function of the discharge rate as indicated by flow line 72.

Controller 28 detects whether traction battery 12 is being charged while EV 10 is being driven to the charging station 18, as indicated by decision block 74. While traction battery 12 is being charged while EV 10 is being driven to the charging station 18, controller 20 controls battery control system 20 according to the optimal cooling trajectory. In this regard, controller 28 controls battery control system 20 according to the optimal cooling trajectory as a function of the charge rate as indicated by flow line 76.

If traction battery 12 is not being recharged while EV 10 is being driven to the charging station 18 and if the SOC of the traction battery is lower than the critically low charge threshold, then controller 28 ceases controlling battery control system 20 according to the optimal cooling trajectory as indicated by block 78. As such, the pre-cooling of traction battery 12 is ceased.

Figure 4:
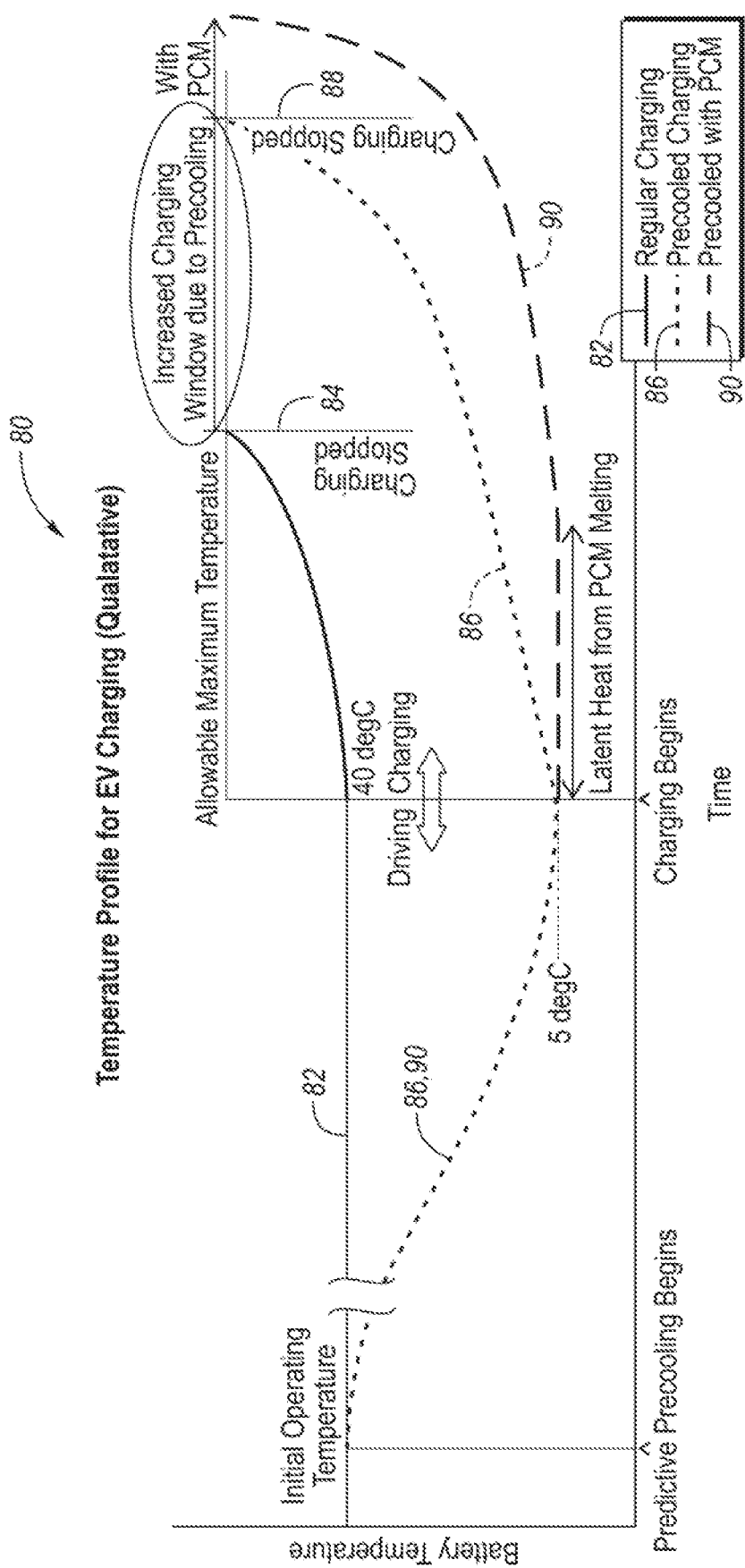
FIG. 4 illustrates an EV charging temperature profile diagram for (i) recharging with no pre-cooling, (ii) recharging with non-cold storage, pre-cooling in accordance with an embodiment, and (iii) recharging with cold storage, pre-cooling in accordance with an embodiment.

Referring now to FIG. 4, an EV charging temperature profile diagram 80 is shown. Diagram 80 is depictive of the temperature of traction battery 12 over time during an overall operation period including driving operation of vehicle 10 prior to pre-cooling of the traction battery, driving operation of the vehicle during pre-cooling of the traction battery from the initiation of the pre-cooling to the termination of the pre-cooling upon the vehicle arriving at charging station 18, and recharging of the traction battery at the charging station.

Diagram 80 includes a first plot 82 indicative of the temperature of traction battery 12 during the overall operation period for the case of the traction battery not being pre-cooled. First plot 82 shows that traction battery 12 has a typical operating temperature (e.g., 40° C.) while vehicle 10 is being driven to charging station 18. As traction battery 12 is not pre-cooled, the temperature of the traction battery at the start of recharging at charging station 18 is the typical operating temperature (i.e., 40° C.). Hence, during recharging the traction battery temperature will rise to the allowable maximum temperature relatively quickly at premature time 84. The recharging is consequently prematurely terminated at premature time 84 (i.e., before traction battery 12 is fully recharged) to allow the traction battery to cool.

Diagram 80 includes a second plot 86 indicative of the temperature of traction battery 12 during the overall operation period for the case of the traction battery being pre-cooled with non-cold storage in accordance with an embodiment. For instance, the pre-cooled, non-cold storage involves circulating coolant through battery case 32 with no PCM disposed therein. Second plot 86 shows that the temperature of traction battery 12 decreases while vehicle 10 is being driven to charging station 18 from the typical operating temperature (i.e., 40° C.) at the start of pre-cooling to a cooled temperature (e.g., 5° C.) upon the vehicle arriving at the charging station. The temperature of traction battery 12 at the start of recharging at charging station 18 is the cooled temperature (i.e., 5° C.). Hence, during recharging the traction battery temperature will rise to the allowable maximum temperature relatively longer at later time 88. Thus, traction battery 12 can be recharged for a longer duration before the traction battery temperature will rise to the allowable maximum temperature than the case of the traction battery not being pre-cooled. However, this longer duration may still not be enough in some cases to enable traction battery 12 to be fully recharged prior to termination of the recharging at later time 88.

Diagram 80 includes a third plot 90 indicative of the temperature of traction battery 12 during the overall operation period for the case of the traction battery being pre-cooled with cold storage in accordance with an embodiment. As described herein, the pre-cooled, cold storage involves circulating coolant through battery case 32 having PCM 30 disposed therein. Third plot 90 shows that the temperature of traction battery 12 decreases while vehicle 10 is being driven to charging station 18 from the typical operating temperature (i.e., 40° C.) at the start of pre-cooling to the cooled temperature (i.e., 5° C.) upon the vehicle arriving at the charging station. The temperature of traction battery 12 at the start of recharging at charging station 18 is the cooled temperature.

Likewise, the temperature of PCM 30 at the start of recharging at charging station 18 is the cooled temperature. Thus, PCM 30 is solid at the start of recharging. During the recharging PCM 30 will absorb the initial brunt of the heat accumulation, such as by melting from solid to liquid. Consequently, the rising of the temperature of traction battery 12 during the recharging will be delayed and it will take even longer for the traction battery temperature to rise to the allowable maximum temperature. Thus, traction battery 12 can be recharged for an even longer duration before the traction battery temperature will rise to the allowable maximum temperature. This longest duration should be enough to enable traction battery 12 to be fully recharged prior to termination of the recharging due to the traction battery temperature rising to the allowable maximum temperature.

As described, the method and system of predicting recharging of traction battery 12 at a charging station 18 and correspondent cold storage, pre-cooling of the traction battery by battery cooling system 20 as EV 10 is being driven to the charging station 18 in accordance with embodiments include the following features. The method and system employ probability detection of the intention of the operator of EV 10 to seek a fast-charge charging station 18. The method and system employ a profile generation for pre-cooling traction battery 12. The goal can be to compute a setpoint trajectory such that the target coldest temperature is reached as EV 10 approaches the charging station 18. Thus, pre-cooling of traction battery 12 by way of cooling PCM 30 is gradual and consumes less power as compared to quickly pre-cooling the traction battery and then maintaining that temperature. In embodiments described herein, the method and system employ specific hardware (and design thereof) by which working fluid is distributed to optimally absorb heat.

In embodiments described herein, the method and system automate the process of detecting that the operator is driving EV 10 to a charging station 18 for recharging and identifying whether the charging station is a fast-charge charging station. Upon detecting that the operator is driving EV 10 to the charging station 18, the method and system pre-cool traction battery 12 so that the traction battery is sufficiently cooled upon the EV reaching the charging station.

In other embodiments, the process is manual in that the operator provides a notification to controller 28 that the operator is driving EV 10 to a selected charging station 18 for recharging. The operator may identify the operator's intention to fast-charge traction battery 12 at the selected charging station 18 and/or the method and system may identify whether the selected charging station is a fast-charge charging station. Upon being notified by the operator that the operator is driving EV 10 to the selected charging station 18, the method and system pre-cool traction battery 12 so that the traction battery is sufficiently cooled upon the EV reaching the selected charging station.

While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments of the present invention.

What is claimed is:

1. A method for an electric vehicle comprising:
automatically detecting by a controller of the vehicle that the vehicle is being driven to a charging station;
pre-cooling a traction battery of the vehicle as the vehicle is being driven to the charging station so that the traction battery is cooled to a target temperature upon the vehicle reaching the charging station;
comparing, by the controller, a state of charge of the traction battery to a state of charge threshold, wherein the state of charge of the traction battery is less than the state of charge threshold; and
wherein automatically detecting by the controller that the vehicle is being driven to the charging station requires that the state of charge of the traction battery be less than the state of charge threshold.

2. The method of claim 1 further comprising:
estimating, by the controller, a discharge rate of the traction battery; and
wherein automatically detecting by the controller that the vehicle is being driven to the charging station depends on the discharge rate of the traction battery.

3. The method of claim 2 further comprising:
detecting, by the controller, a proximity of the vehicle to the charging station; and
wherein automatically detecting by the controller that the vehicle is being driven to the charging station depends on the proximity of the vehicle to the charging station.

4. The method of claim 2 wherein:
pre-cooling the traction battery includes pre-cooling the traction battery at a cooling rate dependent on the discharge rate, the proximity of the vehicle to the charging station, and a charging rate of the charging station.

5. The method of claim 3 wherein:
pre-cooling the traction battery includes cooling a phase change material surrounding at least a portion of the traction battery by circulating refrigerant coolant to the phase change material to cool the phase change material.

6. A method comprising:
pre-cooling a traction battery of a vehicle, upon detecting that the vehicle is being driven to a charging station;
by cooling a phase change material surrounding the battery as the vehicle is being driven to the station at a cooling rate dependent on a discharge rate of the battery and a distance between the vehicle and the station to cool battery to a target temperature upon the vehicle reaching the station.

7. The method of claim 6 wherein:
the phase change material is configured to convert from a liquid state to a solid state as the phase change material is being cooled to thereby pre-cool the traction battery; and
the phase change material is cooled to the solid state when the traction battery is cooled to the target temperature.

8. A system for an electric vehicle comprising:
a battery cooling system including (i) a phase change material surrounding at least a portion of the traction battery and (ii) a source of refrigerant coolant;
a controller configured to automatically detect that the vehicle is being driven to a charging station and to control the battery cooling system to pre-cool a traction battery of the vehicle as the vehicle is being driven to the charging station so that the traction battery is cooled to a target temperature upon the vehicle reaching the charging station; and
the controller controlling the battery cooling system to pre-cool the traction battery as the vehicle is being driven to the charging station includes circulating the refrigerant coolant to the phase change material to cool the phase change material and thereby pre-cool the traction battery.

9. The system of claim 8 wherein:
the controller is further configured to compare a state of charge of the traction battery to a state of charge threshold; and
the controller is further configured to require that the state of charge of the traction battery be less than the state of charge threshold for the controller to automatically detect that the vehicle is being driven to the charging station.

10. The system of claim 9 wherein:
the controller is further configured to estimate a discharge rate of the traction battery; and
while the state of charge of the traction battery is less than the state of charge threshold, the controller is further configured to automatically detect that the vehicle is being driven to the charging station depending on the discharge rate of the traction battery.

11. The system of claim 10 wherein:

the controller is further configured to estimate the discharge rate of the traction battery depending on at least one of driving conditions of the vehicle and driving behavior by an operator of the vehicle.

12. The system of claim 9 wherein:

the controller is further configured to detect a proximity of the vehicle to the charging station; and while the state of charge of the traction battery is less than the state of charge threshold, the controller is further configured to automatically detect that the vehicle is being driven to the charging station depending on the proximity of the vehicle to the charging station.

13. The system of claim 12 wherein:

the controller is further configured to detect the proximity of the vehicle to the charging station depending on at least one of a time of day and a location of the vehicle.

14. The system of claim 8 wherein:

the controller is further configured to control the battery cooling system to function harder in pre-cooling the traction battery while the vehicle is being driven to the charging station in direct proportion to a discharge rate of the traction battery and in inverse proportion to a distance between the vehicle and the charging station while the traction battery is discharging as the vehicle is being driven to the charging station; and the controller is further configured to control the battery cooling system to function harder in pre-cooling the traction battery while the vehicle is being driven to the charging station in direct proportion to a charge rate of the traction battery and in inverse proportion to a distance between the vehicle and the charging station while the traction battery is discharging as the vehicle is being driven to the charging station.

15. The system of claim 8 wherein:

the phase change material is configured to convert from a liquid state to a solid state as the phase change material is being cooled to thereby pre-cool the traction battery; and the phase change material is in the solid state when the traction battery is cooled to the target temperature.

16. The system of claim 15 wherein:

the phase change material is further configured to convert from the solid state to the liquid state to absorb heat generated from recharging the traction battery at the charging station.

17. The system of claim 8 wherein:

the phase change material includes paraffin wax.

* * * * *